(12) United States Patent
Komatsu et al.

(10) Patent No.: US 6,943,983 B2
(45) Date of Patent: Sep. 13, 2005

(54) FLEXIBLE DISK DRIVE INCLUDING SUB CIRCUIT BOARD WITH A HALL ELEMENT MOUNTED THEREON

(75) Inventors: Hisateru Komatsu, Tendo (JP); Makoto Konno, Tendo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 283 days.

(21) Appl. No.: 10/225,366

(22) Filed: Aug. 21, 2002

(65) Prior Publication Data

US 2003/0039061 A1 Feb. 27, 2003

(30) Foreign Application Priority Data

Aug. 22, 2001 (JP) .......................................... 2001-251507

(51) Int. Cl.⁷ .......................... G11B 33/12; G11B 25/04
(52) U.S. Cl. .................... 360/99.04; 310/67 R
(58) Field of Search .......................... 360/97.01–99.12; 310/71, 194, 67 R

(56) References Cited

U.S. PATENT DOCUMENTS

| | | | |
|---|---|---|---|
| 4,224,543 A | * | 9/1980 | Morreale ...................... 310/71 |
| 4,692,913 A | * | 9/1987 | Ackerman et al. ........ 369/30.03 |
| 4,882,511 A | | 11/1989 | von der Heide |
| 5,400,191 A | | 3/1995 | Sakaguchi et al. |
| 5,408,153 A | | 4/1995 | Imai et al. |
| 5,436,517 A | | 7/1995 | Ogawa et al. |
| 5,623,382 A | | 4/1997 | Moritan et al. |
| 5,637,945 A | | 6/1997 | Yamamuro et al. |
| 6,013,965 A | | 1/2000 | Suzuki et al. |
| 6,081,057 A | | 6/2000 | Tanaka et al. |
| 6,081,058 A | | 6/2000 | Suzuki et al. |
| 6,166,501 A | * | 12/2000 | Furuki et al. ................ 318/254 |
| 6,218,760 B1 | | 4/2001 | Sakuragi et al. |
| 6,232,687 B1 | * | 5/2001 | Hollenbeck et al. .......... 310/88 |
| 6,316,856 B1 | | 11/2001 | Kusaki et al. |
| 6,414,409 B1 | | 7/2002 | Masuda |
| 6,476,528 B2 | | 11/2002 | Sekine |
| 6,545,379 B2 | | 4/2003 | Gomyo |
| 6,603,304 B2 | * | 8/2003 | Sekine ................... 324/207.15 |
| 6,603,635 B1 | | 8/2003 | Suzuki et al. |
| 6,697,215 B2 | * | 2/2004 | Sekine ...................... 360/97.01 |
| 2001/0006332 A1 | | 7/2001 | Shibata et al. |
| 2003/0039060 A1 | | 2/2003 | Komatsu et al. |
| 2003/0102731 A1 | | 6/2003 | Shibata et al. |

FOREIGN PATENT DOCUMENTS

| | | |
|---|---|---|
| JP | 9-91859 A | 4/1997 |
| JP | 9-97493 A | 4/1997 |
| JP | 9-97839 A | 4/1997 |
| JP | 2000-245125 A | 9/2000 |
| JP | 2001-178185 A | 6/2001 |
| JP | 2001-190055 A | 7/2001 |

* cited by examiner

Primary Examiner—Angel Castro
(74) Attorney, Agent, or Firm—Frishauf, Holtz, Goodman & Chick, P.C.

(57) ABSTRACT

A flexible disk drive includes a notched portion at a main frame portion arranged with a motor, a sub board includes a cut groove at an end portion thereof and a wire extended from the motor is held by the cut groove of the sub board and is connected to the main board. Thereby, there can be provided FDD capable of achieving a reduction in cost by a reduction in a number of parts and simplification of a structure thereof.

12 Claims, 10 Drawing Sheets

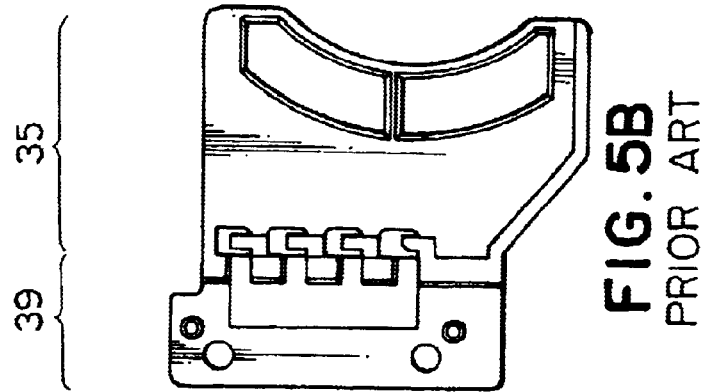
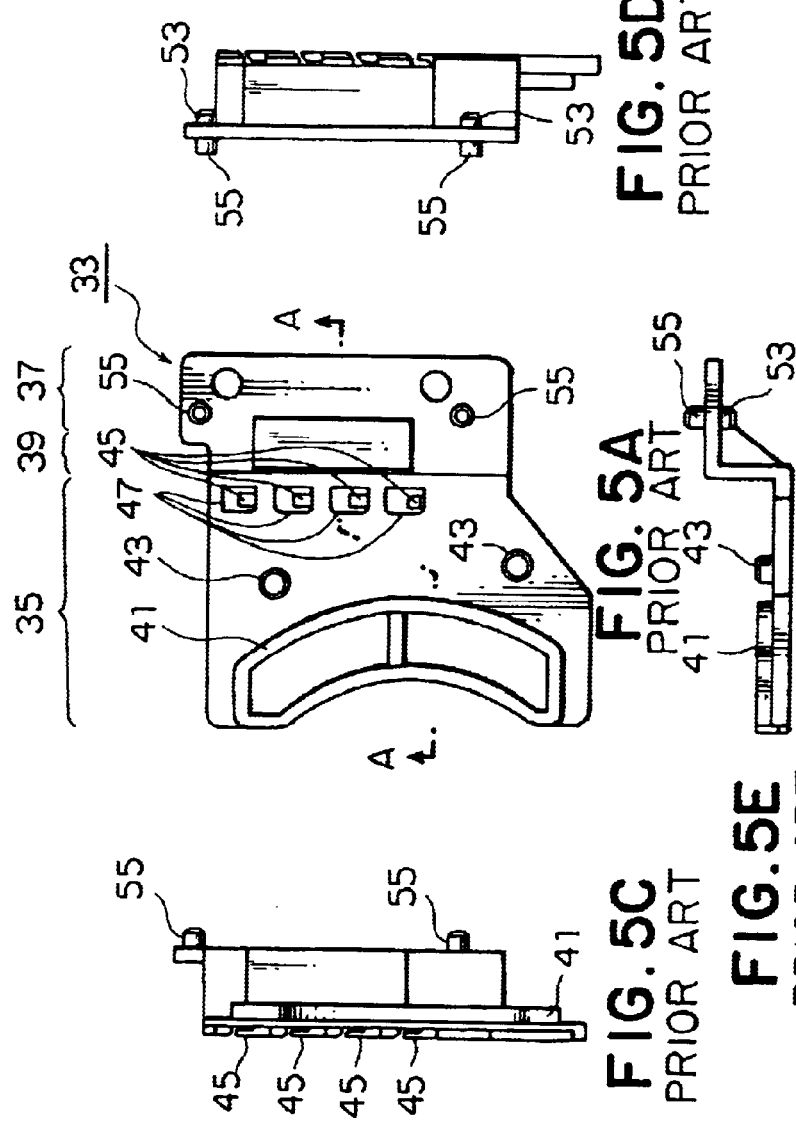
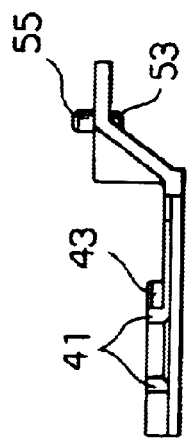
FIG. 5B PRIOR ART
FIG. 5D PRIOR ART
FIG. 5A PRIOR ART
FIG. 5E PRIOR ART
FIG. 5F PRIOR ART
FIG. 5C PRIOR ART

FLEXIBLE DISK DRIVE INCLUDING SUB CIRCUIT BOARD WITH A HALL ELEMENT MOUNTED THEREON

BACKGROUND OF THE INVENTION

(1) Field of the Invention

The present invention relates to a flexible disk drive (hereinafter, referred to as FDD) for recording and reproducing information to and from a flexible magnetic disk contained in a cartridge comprising a plastic case, particularly to a wiring structure of a motor portion of the flexible disk drive in which a motor frame portion is integrated to a main frame.

(2) Description of the Related Art

Conventionally, in a word processor, a personal computer or the like, use is made of a flexible magnetic disk drive (hereinafter, referred to as FDD) capable of writing and reading information to and from a flexible magnetic disk contained in a plastic cartridge.

According to a conventional FDD, in accordance with FG sensorless formation of a spindle motor structure, PWB of a motor portion is omitted. Even in such a case, it is necessary to connect a winding or exciting coil of a core for a motor to an external PWB and therefore, the case is dealt with by adding a core holder constituting a part dealing with the winding. Therefore, the spindle motor has a drawback that a number of parts becomes large and integration steps are complicated.

SUMMARY OF THE INVENTION

It is an object of the present invention to provide FDD capable of achieving a reduction in cost by a reduction in a number of parts and simplification of a structure thereof.

According to an aspect of the present invention, there is provided a flexible disk drive which comprises a main frame inserted with a flexible disk, a motor mounted on a main surface side of the main frame for driving to rotate the flexible disk, and a circuit board attached to a rear face side of the main frame and mounted with a control circuit for controlling to drive the motor. The motor includes a rotor rotatably arranged around a rotating shaft thereof and a stator coupled with the rotor and including an exciting coil. An outer peripheral side face of the rotor is attached with an index detecting magnet. The circuit board includes a main circuit board mounted with the control circuit and extended in a direction orthogonal to the rotating shaft of the motor and a sub circuit board attached to the main circuit board to extend in a direction in parallel with the rotating shaft of the motor at a position proximate to the outer peripheral side face of the rotor. The sub circuit board is attached with an index detecting Hall element having a magnetic field detecting face arranged to be opposed to the outer peripheral side face of the rotor. In the aspect of the present invention, a portion of the main frame arranged with the motor includes a notched portion. The sub board includes a cut groove at an end portion thereof and a wire extended from the motor is held by the cut groove of the sub board and is connected to the main board.

Further, according to another aspect of the invention, there is provided a frame structure which comprises a main frame inserted with a flexible disk, a motor mounted on a main surface side of the main frame for driving to rotate the flexible disk, and a circuit board attached to a rear face side of the main frame and mounted with a control circuit for controlling to drive the motor. The motor includes a rotor rotatably arranged around a rotating shaft thereof and a stator coupled with the rotor an exciting coil. An outer peripheral side face of the rotor is attached with an index detecting magnet. The circuit board includes a main circuit board mounted with the control circuit and extended in a direction orthogonal to the rotating shaft of the motor and a sub circuit board attached to the main circuit board to extend in a direction in parallel with the rotating shaft of the motor at a position proximate to the outer peripheral side face of the rotor. The sub circuit board is attached with an index detecting Hall element having a magnetic field detecting face arranged to be opposed to the outer peripheral side face of the rotor. In the aspect of the present invention, a portion of the main frame arranged with the motor includes a notched portion. The sub board includes the cut groove at an end portion thereof and a wire extended from the motor is held by passing through the cut groove of the sub board and is connected to the main board.

Here, in the respective aspects of the invention, it is preferable that the cut groove is constituted by a V-like shape.

BRIEF DESCRIPTION OF THE DRAWINGS

FIG. 5A is a plane view of a guide member used in the related art;

FIG. 5B is a rear view of the guide member of FIG. 5A;

FIG. 5C is a left side view of the guide member of FIG. 5A;

FIG. 5D is a right side view of the guide member of FIG. 5A;

FIG. 5E is a front view of the guide member of FIG. 5A;

FIG. 5F is a sectional view taken along a line A—A of FIG. 5A;

DESCRIPTION OF THE PREFERRED EMBODIMENTS

Before describing embodiments of the invention, in order to facilitate to understand the invention, with regard to a flexible disk drive according to a related art, an explanation will be made in reference to FIG. 1 through FIG. 8.

First, an explanation will be made as regards a frame structure (or main frame) 15 used in a conventional flexible disk drive in reference to FIG. 1 through FIG. 3.

Figure 1:
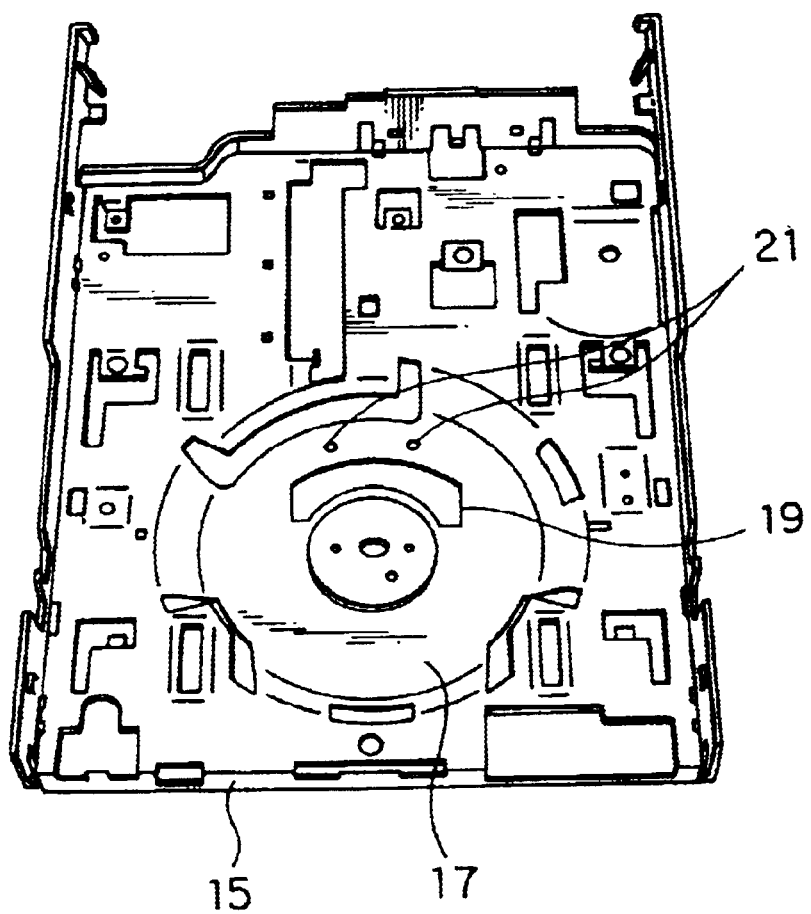
FIG. 1 is a perspective view showing a main frame used in a related art from a front upper side.
Figure 2:
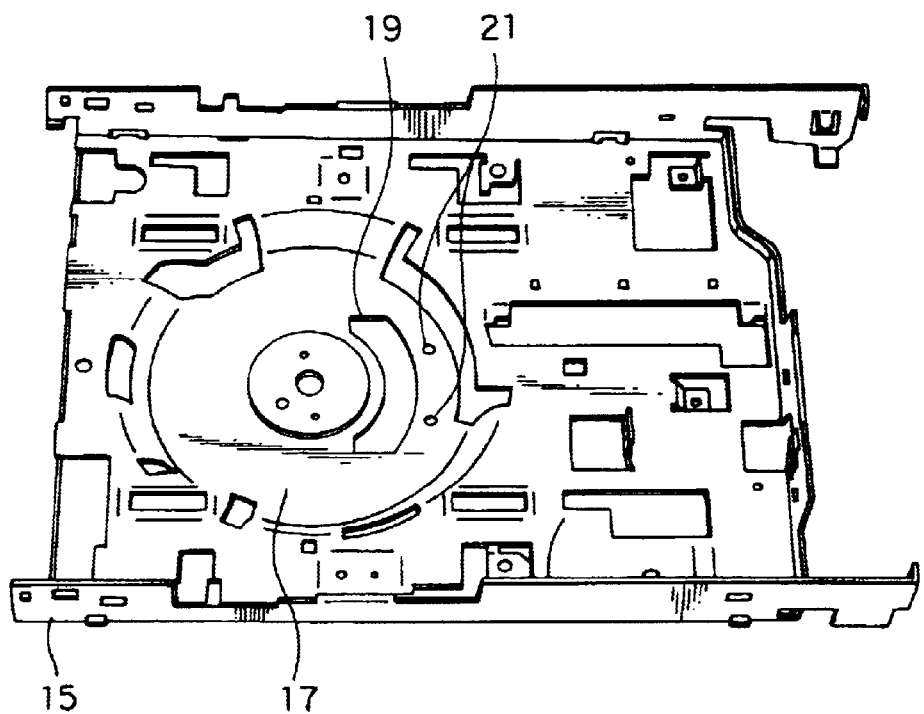
FIG. 2 is a perspective view showing the main frame of FIG. 1 from a side upper side.
Figure 3:
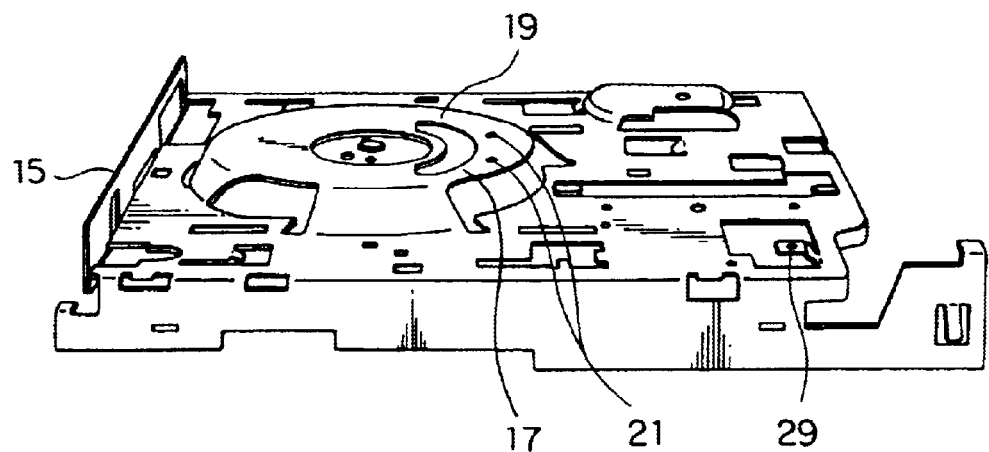
FIG. 3 is a perspective view showing the main frame of FIG. 1 from a side lower side.

As is apparent from FIG. 1 through FIG. 3, according to the main frame, i.e. frame structure 15, there are integrally constituted in one piece, the main frame 15 inserted with a flexible magnetic disk (FD) and serving also as a motor frame, and a motor frame portion 17 for mounting a spindle motor (not illustrated) for driving to rotate the flexible magnetic disk inserted therein.

Here, the motor frame portion 17 is provided with a drawn shape produced by drawing (for example by press-working). As shown by FIG. 3, in view from a rear side, this is a structure in which the motor frame portion 17 is projected to the rear side. The motor frame portion 17 is formed with an opening portion 19 for leading out a lead wire of the spindle motor and a through hole 21 for fixing a guide member (not illustrated) at a portion thereof constituting a top face when viewed from the rear side.

In the case of the flexible disk drive according to the related art, by omitting a frequency generating pattern FGPT necessary for controlling the spindle motor (not illustrated), that is, by omitting a printed wiring board, the main frame 15 having the above-described shape is adopted. Further, by omitting the frequency generating pattern FGPT, there is no need to provide motor servo magnetized elements to a bottom face portion of a permanent magnet of a rotor, mentioned later. Instead, the flexible disk drive according to the related art is provided with electronic processing means achieving a function equivalent to that in the case of using FGPT. Further, with regard to more in details of operation of such an electronic processing means, please refer to Japanese Unexamined Patent Publication No. 2000-245125 (JP 2000-245125 A).

Figure 4:
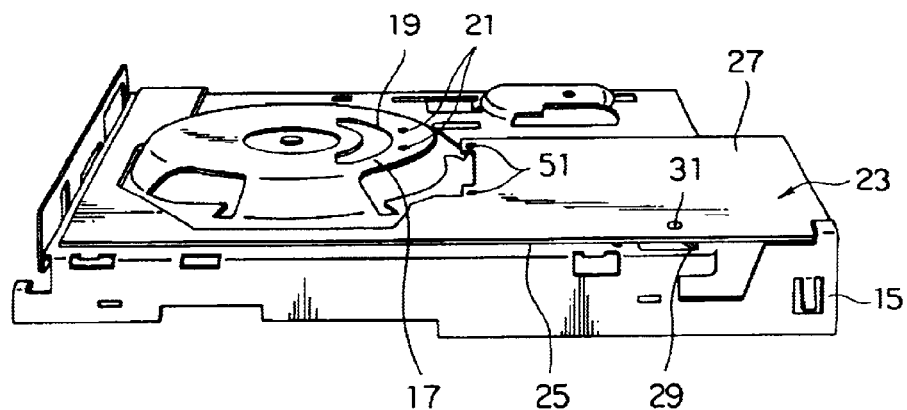
FIG. 4 is a perspective view showing a state of attaching a main printed board to the main frame of FIG. 1 from a side lower side.

A main printed board 23 of the flexible disk drive according to the related art is attached to a rear face side of the main frame 15 similar to conventional technology. As shown by FIG. 4, the main printed board 23 is provided with a shape which does not overlap the motor frame portion 17. Further, a support piece or receiving piece 29 with a screw hole at a front end thereof is cut to rise from the main frame 15. The main printed board 23 is fixed to the support piece 29 by a screw 31 such that a surface 25 thereof is separated from a rear face of the main frame 15 such that a rear face 27 thereof becomes proximate to the rear face of the main frame 15 and lower than the top face of the motor frame portion 17.

On a main surface side of the main frame 15, a coil is wound around a stator of a motor mounted to the motor frame portion 17. A front end portion or lead wire of the coil is extended from the opening portion 19 formed at the main frame 15 to the rear face side and is fixedly connected to a predetermined terminal of the main printed board 23. Normally, the lead wire includes a total of four pieces of lead wires of three pieces of lead wires constituting ends on one side of coils of respective phases of U, V, and W and a lead wire bundling other ends of the coils in one piece.

The flexible disk drive according to the related art is provided with a guide member 33 as shown by FIG. 5A through FIG. 5F for guiding the lead wires.

The guide member 33 is formed by an insulating plastic and is composed of a portion 35 attached to the main frame 15, a portion 37 attached to the main printed board 23, and a portion 39 for connecting the portion 35 and the portion 37.

The guide member 33 has the portion 35 attached to the main frame 15. The portion has a face that is actually brought into contact with the main frame 15. At the face, a projected streak frame 41 fitted to the opening portion 19 and an engaging pin 43 inserted into the through hole 21 are formed. Further, at a face on a side opposed to the face of the portion 35 attached to the main frame 15, which is actually brought into contact with the main frame 15, a claw 45 is formed for locking the respective lead wire and a hole 47 is also formed in corresponds with the claw 45.

Further, the guide member 33 has the portion 37 attached to the main printed board 23. The portion 37 has a face that is actually brought into contact with the main printed board 23. The face is one directed in a direction opposed to the face of the portion 35 attached to the main frame 15, which is actually brought into contact with the main frame 15. Further, the face is brought into contact with the main printed board 23, and is formed with an engaging pin 53 inserted into a through hole 51 (FIG. 4) formed at the main printed board 23.

Further, the through hole 51 formed at the main printed board 23, is provided with a diameter considerably smaller than that of a screw hole, for example, about a half thereof, which is used for fixing the main printed board 23 to the main frame 15. Further, at a face thereof on a side opposed to the face which is actually brought into contact with the main printed board 23, a support projection 55 is formed for supporting the main printed board 23 by being brought into contact with the main frame 15. As a result, the main printed board 23 can be reduced in a number of screw holes for fixing the main printed board 23 to the main frame 15 and therefore, strength of the main printed board 23 can be promoted. Further, the support pieces 29 are cut to rise from the main frame 15 for attaching the main printed board 23 to the main frame 15 and are formed with the screw holes. A number of the support pieces 29 can be reduced and therefore, strength of the main frame 15 can be promoted.

Figure 6:
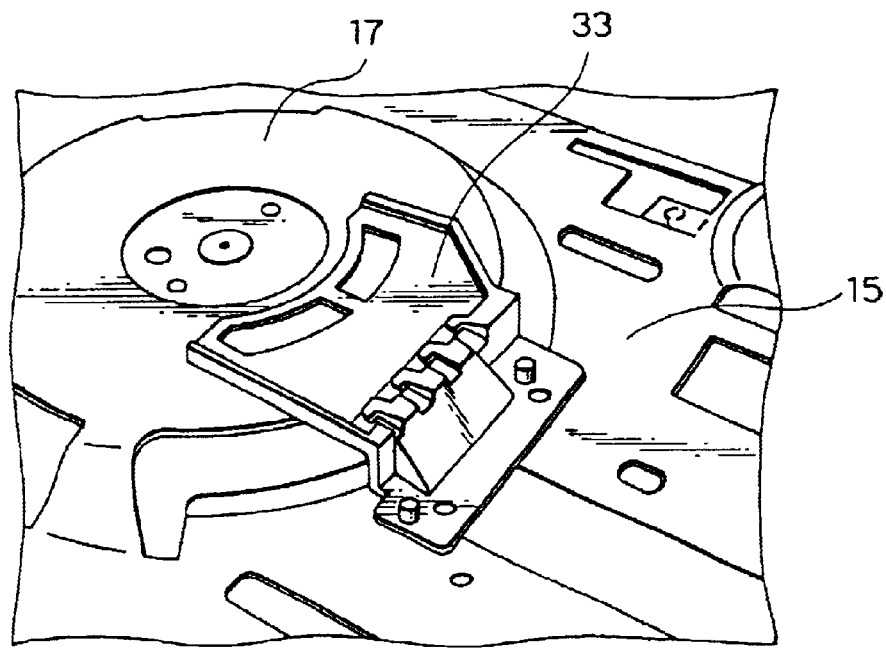
FIG. 6 is a view showing the guide member of FIG. 5A in a state of being attached to the main frame.
Figure 7:
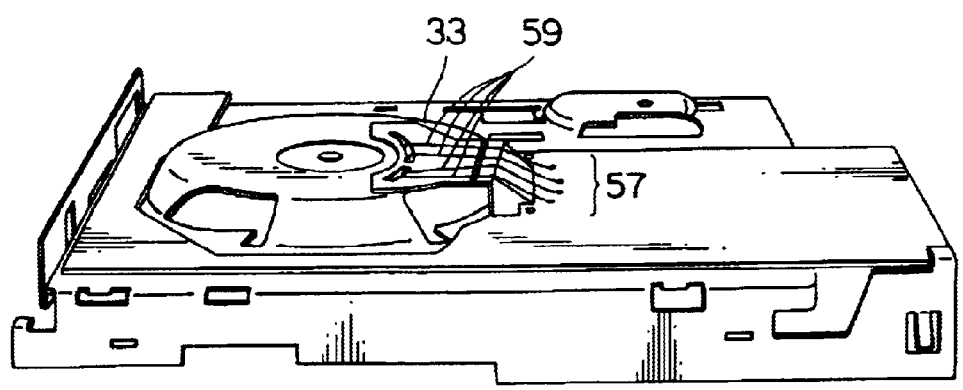
FIG. 7 is a view showing a state of attaching a main printed board to the main frame attached with the guide member of FIG. 5A.

The guide member 33 is attached to the main frame 15 by inserting the projected streak frame 41 of the portion 35 attached to the main frame 15 and the engaging pin 43 respectively to the opening portion 19 and the through hole 21. A behavior thereof is shown in FIG. 6. In this way, the lead wire is led out from the opening portion 19, and is brought into contact with the projected streak frame 41 by inserting the projected streak frame 41 into the opening portion 19, and therefore, the lead wire is not brought into direct contact with the opening portion 19.

Thereafter, the main printed board 23 is fixed to the main frame 15 such that the engaging pin 53 of the portion 37 attached to the main printed board 23 is inserted into the thought hole 51 of the main printed board 23. (See FIG. 7). As a result, the portion of the guide member 33 advances into an interval between the main printed board 23 and the main frame 15.

Thus, the guide member 33 is disposed between the lead wires and the main frame 15 from the opening portion 19 of the main frame 15 over to the main printed board 23.

Figure 8:
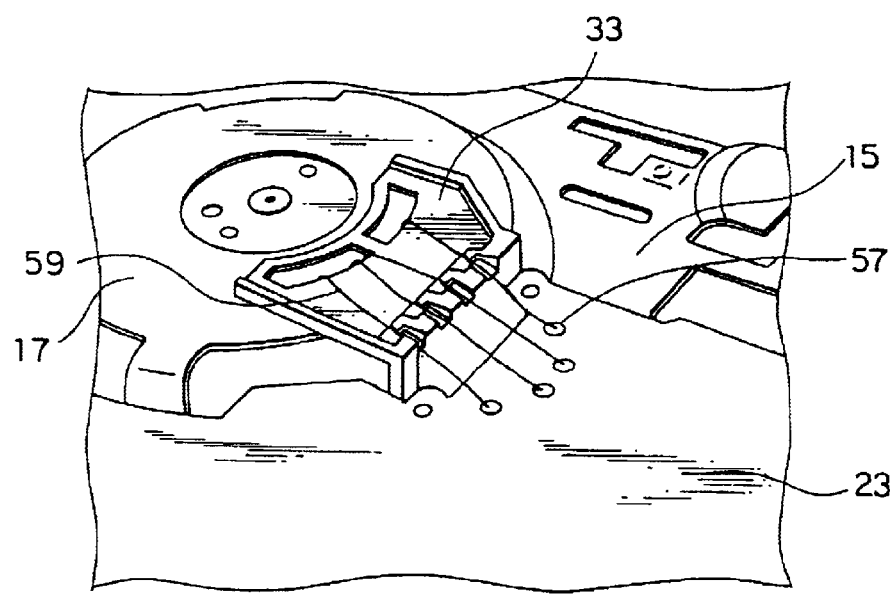
FIG. 8 is a view showing a state of hanging a lead wire on a claw of the guide member of FIG. 5A.

The lead wire is extended from the opening portion 19 and is hung on and fixedly held by the claw 45. A front end of the wire is fixedly connected to a predetermined terminal 57 of the main printed board 23. A behavior thereof is shown in FIG. 8.

As a result of the above-described, the guide member 33 prevents that in connecting the lead wire 59, an insulating cover film thereof is broken by bringing the lead wire 59 into contact with the opening portion 19 and is shortcircuited with the main frame 15. Further, it is prevented that the lead wires are brought into contact with each other, the insulating cover films are broken, and the lead wires are shortcircuited. Further, the respective lead wires are guided such that the respective lead wires are not connected to terminals different from the predetermined terminals.

Now, a detailed explanation will be made as regards embodiments of the invention in reference to the drawings. Further, according to a flexible disk drive of the invention, many portions thereof are the same as those of the conventional flexible disk drive and therefore, in the following, an explanation will be given only of portions different from those in the related art.

First, an explanation will be made as regards a frame structure or main frame 61 used in a flexible disk drive according to an embodiment of the invention in reference to FIG. 9.

Figure 9:
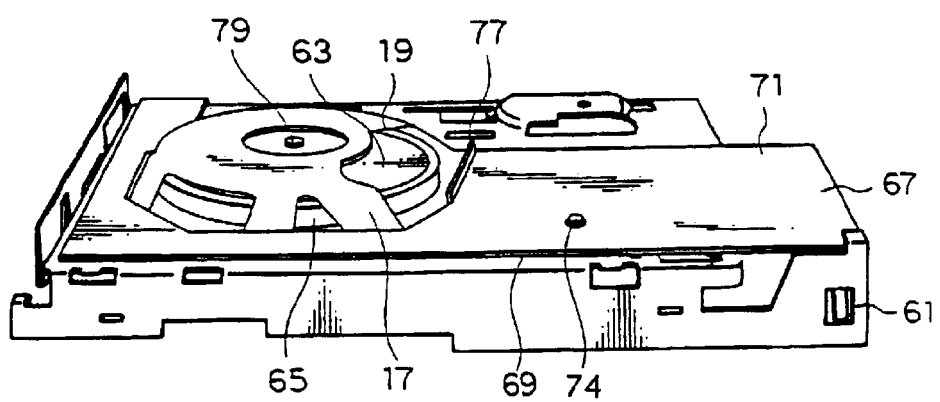
FIG. 9 is a perspective view showing a state of attaching a main printed wiring printed board and a sub printed wiring board to a main frame used in an embodiment of the invention from a side lower side.

As is apparent from FIG. 9, according to the main frame or frame structure 61, there are integrally constituted in one piece, the main frame 61 inserted with a flexible magnetic disk and the motor frame portion 17 mounted with a spindle motor (not illustrated) for driving to rotate the flexible magnetic disk inserted therein. That is, the main frame 61 serves also as the motor frame.

Here, the motor frame portion 17 is provided with the drawn shape produced by drawing. This is a structure in which the motor frame portion 17 is projected to the rear face side when viewed from the rear face side. The motor frame portion 17 is formed with the opening portion 19 for leading out the lead wire of the spindle motor at a portion thereof constituting the top face when viewed from the rear face side.

Further, although the drawn shape of the motor frame portion 17 shown in FIG. 9 is a circular shape, the shape is not limited thereto but may be a polygonal shape or an elliptical shape depending on a depth or a material thereof. Further, also an undrawn shape in the drawn shape of the motor frame portion 17 is not limited to the illustrated shape but may be various shapes, further, a way of connecting to the main frame 61 is not naturally limited to the illustrated way.

In the case of the flexible disk drive according to the embodiment, by omitting a frequency generating pattern FGPT necessary for controlling the spindle motor 63, that is, by omitting a printed wiring board, the main frame 61 is adopted which has the above-described shape. Further, by omitting the frequency generating pattern FGPT, the flexible disk drive does not require motor servo magnetizing elements to be provided to a bottom face portion of a permanent magnet of a rotor 65. Instead thereof, the flexible disk drive according to the embodiment is provided with electronic processing means achieving a function equivalent to that in the case of using FGPT. Further, with regard to operation of such an electronic processing means, please refer to Japanese Unexamined Patent Publication No. 2001-178185 (JP 2001-178185 A).

A main printed board 67 of the flexible disk drive according to the embodiment is attached to a rear face side of the main frame 61 similar to the related art.

As shown by FIG. 9, the main printed wiring board 67 is provided with a shape which does not overlap the motor frame portion 17. Further, a support piece (not illustrated) with a screw hole at a front end thereof is cut to rise from the main frame 61. The main printed wiring board 67 is fixed to the support piece by a screw 74 such that a surface 69 thereof is separated from a rear face of the main frame 61 by a predetermined distance such that the rear face 71 becomes proximate to the rear face of the main frame 61 and lower than the top face of the motor frame portion 17.

Figure 10:
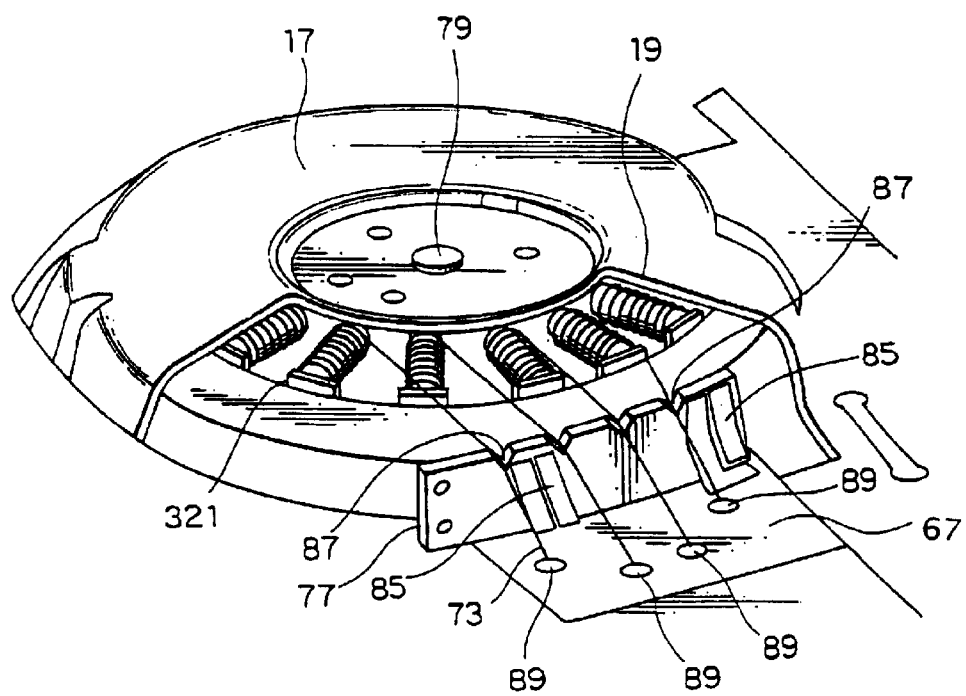
FIG. 10 is a partially perspective view showing a state of hanging a lead wire in a groove of the sub printed wiring board of FIG. 9.

As shown by FIG. 10, on a main surface side of the main frame 61, a front end portion or lead wire of an exciting coil 321 wound around a stator of a motor mounted to the motor frame portion 17, is extended from the opening portion 19 formed at the main frame 61 to a rear face side and is fixedly connected to a predetermined terminal of the main printed wiring board 67. Normally, the lead wire includes a total of four pieces of lead wires 73 of three pieces of lead wires 73 constituting ends on one side of coils of respective phases of U, V, and W and a lead wire bundling other ends of the coils into one lead wire. In the case of the flexible disk drive according to the embodiment, a sub printed wiring board 77 is provided as shown by FIG. 11 through FIG. 13 for guiding the lead wires 73 and mounted with an index detecting Hall element 75 as mentioned later.

Here, a main printed wiring board 67 is extended in a direction orthogonal to a rotating shaft 79 of the spindle motor 63. In contrast thereto, the sub printed wiring board 77 is attached to the main printed wiring board 67 to extend in a direction in parallel with the rotating shaft 79 of the spindle motor 63 at a position proximate to an outer peripheral side face of a rotor 65 of the spindle motor 63.

Figure 11:
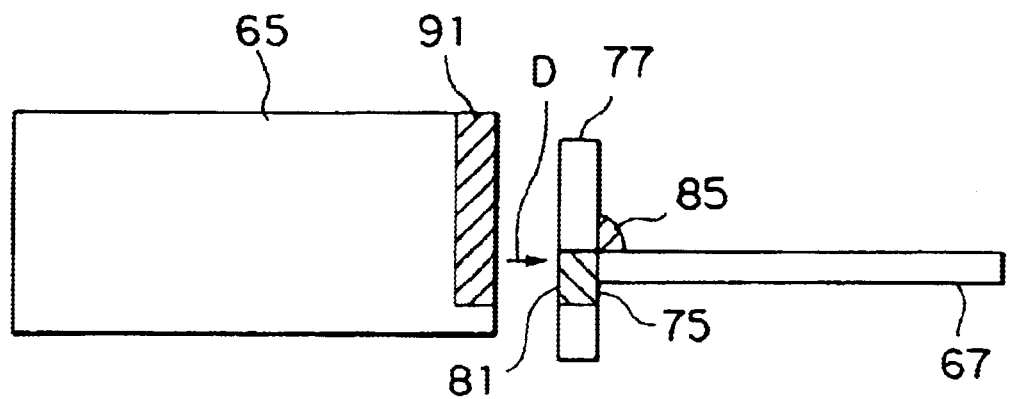
FIG. 11 is a view showing an arrangement relationship between an index detecting magnet attached to a rotor and an index detecting Hall element mounted to the sub printed wiring board.
Figure 12:
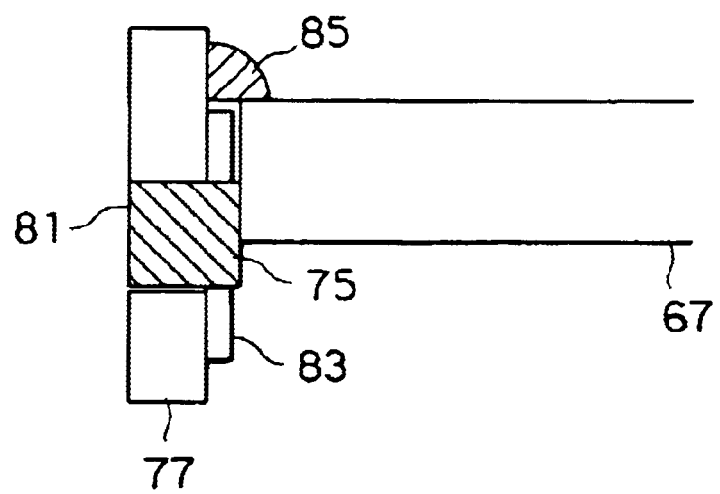
FIG. 12 is a view showing a state of attaching the sub printed wiring board mounted with the index detecting Hall element shown in FIG. 11 and the main printed wiring board.
Figure 13:
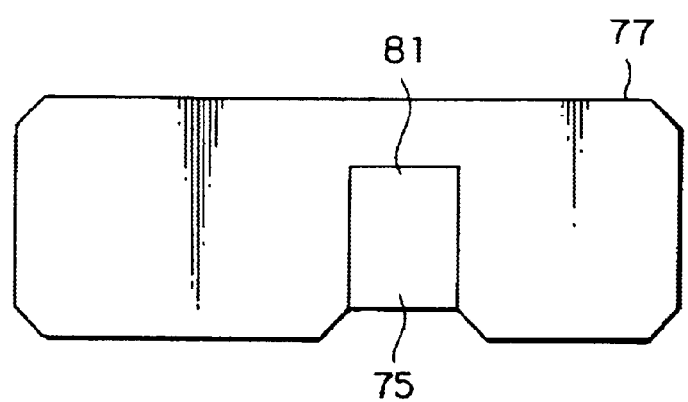
FIG. 13 is a plane view showing an outer shape of the sub printed wiring board mounted with the index detecting Hall element used in the main frame of FIG. 11.

Further, as shown by FIGS. 11 and 12, the index detecting Hall element 75 is attached to the sub printed wiring board 77 such that a magnetic field detecting face 81 thereof is opposed to the outer peripheral side face of the rotor 65. Further, the index detecting Hall element 75 is provided with four terminals 83 and the terminals 83 are electrically connected to wirings (not illustrated) of the main printed wiring board 67 via solders 85. Further, the solders 85 serve not only to constitute the electric connection but also to mechanically couple the main printed wiring board 67 and the sub printed wiring board 77.

Further, as shown in FIG. 10 the lead wire 73 is extended from the opening portion 19 and is hung on, guided by and fixedly held by a groove 87 in a V-like shape of the sub printed wiring board 77. A front end of the lead wire is fixedly connected to a predetermined terminal 89 of the main printed wiring board 61.

In this way, according to the invention, as the index detecting Hall element 75, use is made of a Hall element generally on sale, in which a normal line of a magnetic field detecting face is in a direction orthogonal to a mounted face, and the index detecting Hall element 75 is mounted to the sub printed wiring board 77 in the form in which the magnetic field detecting face 81 is opposed to an index detecting magnet 91. Thereby, a condition of the Hall element 75 for magnetic field detecting sensitivity can be improved. Further, use is not made of a special Hall element in which a magnetic field detecting face is disposed at a side face thereof and therefore, the cost is reduced.

The invention is not limited to the above-described embodiments but can naturally be changed or modified variously within a range not deviated from the gist of the invention.

As has been explained above, according to the invention, there can be provided the flexible disk drive capable of achieving a reduction in cost by a reduction in a number of parts and simplification of a structure thereof.

What is claimed is:

1. A flexible disk drive comprising:
   (i) a main frame adapted to have a flexible disk inserted therein;
   (ii) a motor mounted on a main surface side of the main frame for rotating the flexible disk, the motor comprising:
      a rotor rotatably arranged around a rotating shaft; and
      a stator coupled with the rotor and including an exciting coil;
      wherein an outer peripheral side face of the rotor has an index detecting magnet attached thereto; and
   (iii) a circuit board attached to a rear face side of the main frame and having a control circuit for controlling the motor mounted thereon, the circuit board comprising:
      a main circuit board which has the control circuit mounted thereon, and which extends in a direction orthogonal to the rotating shaft of the motor; and
      a sub circuit board which is attached to the main circuit board at a position proximate to the outer peripheral side face of the rotor, and which extends in a direction parallel to the rotating shaft of the motor;
      wherein the sub circuit board has an index detecting Hall element attached thereto such that a magnetic field detecting face of the Hall element opposes the outer peripheral side face of the rotor;
      wherein a portion of the main frame on which the motor is mounted includes a notched portion, and the sub circuit board has a plurality of cut grooves in an end portion thereof; and
      wherein a plurality of lead wires extend from the motor, and are supported by the plurality of cut grooves in the sub circuit board, and are connected to the main circuit board.

2. The flexible disk drive according to claim 1, wherein the plurality of lead wires extend through the notched portion to the rear face side of the main frame.

3. The flexible disk drive according to claim 2, wherein the main frame comprises a motor frame portion which is defined by the main face side of the main frame projecting past the rear face side of the main frame in the portion of the main frame on which the motor is mounted to form a trapezoidal shape;
   wherein the notched portion is provided in the motor frame portion of the main frame; and
   wherein the sub circuit board is provided adjacent to the motor frame.

4. The flexible disk drive according to claim 1, wherein the main circuit board and the sub circuit board are bonded to each other by soldering.

5. The flexible disk drive according to claim 1, further comprising a plurality of solders for bonding the plurality of lead wires to a pattern of the main circuit board.

6. The flexible disk drive according to claim 1, wherein each of the plurality of cut groove has a V-like shape.

7. A frame structure comprising:
   (i) a main frame adapted to have a flexible disk inserted therein;
   (ii) a motor mounted on a main surface side of the main frame for rotating the flexible disk, the motor comprising:
      a rotor rotatably arranged around a rotating shaft; and
      a stator coupled with the rotor and including an exciting coil;
      wherein an outer peripheral side face of the rotor has an index detecting magnet attached thereto; and
   (iii) a circuit board attached to a rear face side of the main frame and having a control circuit for controlling the motor mounted thereon, the circuit board comprising:
      a main circuit board which has the control circuit mounted thereon, and which extends in a direction orthogonal to the rotating shaft of the motor; and
      a sub circuit board which is attached to the main circuit board at a position proximate to the outer peripheral side face of the rotor, and which extends in a direction parallel to the rotating shaft of the motor;
      wherein the sub circuit board has an index detecting Hall element attached thereto such that a magnetic field detecting face of the Hall element opposes the outer peripheral side face of the rotor;
   wherein a portion of the main frame on which the motor is mounted includes a notched portion, and the sub circuit board has a plurality of cut grooves in an end portion thereof; and
   wherein a plurality of lead wires extend from the motor, and are supported by the plurality of cut grooves in the sub circuit board, and are connected to the main circuit board.

8. The frame structure according to claim 7, wherein the plurality of lead wires extend through the notched portion to the rear face side of the main frame.

9. The frame structure according to claim 8, wherein the main frame comprises a motor frame portion which is defined by the main face side of the main frame projecting past the rear face side of the main frame in the portion of the main frame on which the motor is mounted to form a trapezoidal shape;
   wherein the notched portion is provided in the motor frame portion of the main frame; and
   wherein the sub circuit board is provided adjacent to the motor frame.

10. The frame structure according to claim 7, wherein the main circuit board and the sub circuit board are bonded to each other by soldering.

11. The frame structure according to claim 7, further comprising a plurality of solders for bonding the plurality of lead wires to a pattern of the main circuit board.

12. The frame structure according to claim 7, wherein each of the plurality of cut grooves has a V-like shape.

* * * * *